United States Patent [19]

Armbrust et al.

[11] 3,723,555
[45] Mar. 27, 1973

[54] PRODUCTION OF 1-METHYL-3-PHENYLINDANS

[75] Inventors: Herbert Armbrust, Gruenstadt; Gerhard Kilpper, Mannheim; Waldemar Koehler; Hans-Georg Schecker, both of Ludwigshafen; Hans-Juergen Sturm, Gruenstadt, all of Germany

[73] Assignee: Badische Anilin- & Soda-Fabrik Aktiengesellschaft, Ludwigshafen/Rhine, Germany

[22] Filed: June 3, 1971

[21] Appl. No.: 149,779

[52] U.S. Cl. ............................260/668 F, 260/669 P
[51] Int. Cl. .................................................C07c 15/20
[58] Field of Search .............260/666.5, 668 F, 669 P

[56] References Cited

UNITED STATES PATENTS

| | | | |
|---|---|---|---|
| 3,248,440 | 4/1966 | Albert | 260/666.5 |
| 3,426,063 | 2/1969 | Gros | 260/666.5 |
| 3,432,563 | 3/1969 | Metzler | 260/666.5 |
| 2,249,987 | 7/1941 | Stanley et al. | 260/668 F |
| 3,161,692 | 12/1964 | McLaughlin et al. | 260/669 P |
| 3,385,905 | 5/1968 | Smith et al. | 260/669 P |

OTHER PUBLICATIONS

Volkov, Chem. Abs., 65, 7278c, 1966
Barton et al., J.C.S., May 1964, pp. 1573–1580
Mayo, J.A.C.S. 90, 5, Feb. 28, 1968, pp. 1289–1295

*Primary Examiner*—Curtis R. Davis
*Attorney*—Johnston, Root, O'Keeffe, Keil, Thompson & Shurtleff

[57] ABSTRACT

The production of 1-methyl-3-phenylindans by dimerization of styrenes in the presence of catalysts and poly-merization inhibitors. The products are valuable starting materials for the production of dyes and pesticides.

10 Claims, No Drawings

PRODUCTION OF 1-METHYL-3-PHENYLINDANS

The invention relates to a process for the production of 1-methyl-3-phenylindans by dimerization of styrenes in the presence of catalysts and polymerization inhibitors.

It is known that styrene can be dimerized in the presence of phosphoric acid, sulfuric acid or other mineral acids and in the presence of solid acid catalysts at elevated temperature to form a mixture of 1,3-diphenylbutene-(1) and 1-methyl-3-phenylindan (J. Org. Chem., volume 19 (1954), pages 17 et seq. and volume 27 (1962), pages 27 et seq.; J. Chem. Soc., pages 1573 et seq (1964); Organic Synthesis, Coll. Volume IV (J.Wiley, N.Y.), pages 665 et seq.). The reaction constitutes a complicated system of side reactions and secondary reactions. The first step of the reaction is dimerization of monomeric styrene to 1,3-diphenylbutene. Cyclization of the transform into indan then takes place as a secondary reaction. Trimers and higher polymers form as further undesired byproducts starting from the cis and trans forms.

All these methods are economically unsatisfactory on an industrial scale. While high reaction rates (space-time yields about 1 kg of indan per liter of reaction space per hour) give only yields of end product of up to 30 percent of theory and large amounts of higher linear styrene oligomers, higher yields can be obtained at lower reaction speeds but only low space-time yields of about 0.01 kg per liter per hour then result.

This invention has as an object a new process for producing 1-methyl-3-phenylindan in both better yields and space-time yields and in high purity in a simpler and more economical manner.

We have found that a 1-methyl-3-phenylindan having the general formula:

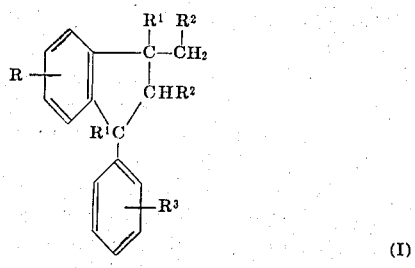

(I)

in which $R^1$, $R^2$ and $R^3$ may be identical or different and each denotes an alkyl radical or a hydrogen atom, and $R^3$ may also denote a halogen atom, are obtained advantageously by dimerization of a styrene in the presence of a catalyst by carrying out the reaction with a styrene having the general formula:

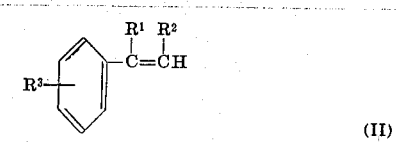

(II)

in which $R^1$, $R^2$ and $R^3$ have the meanings given above in the presence of a polymerization inhibitor.

When styrene itself is used, the reaction may be represented by the following formulas:

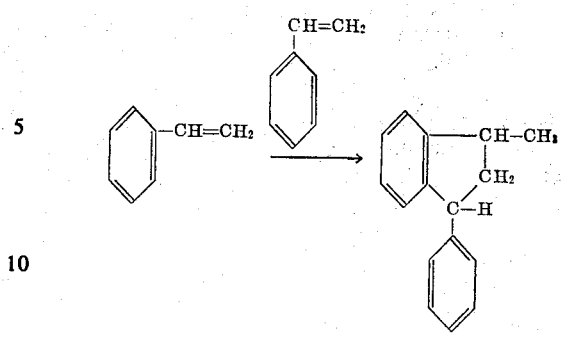

As compared with prior art methods, the process according to the invention gives 1-methyl-3-phenylindans in better yields and better space-time yields, in good purity and by a simpler and more economical method. Yields of end product of 65 to 80 percent of theory (based on reacted styrene) can be achieved at high space-time yields. These advantageous results are surprising having regard to the state of the art.

Preferred starting materials having the generals formula (II) — and accordingly preferred end products having the formula (I) — are those in whose formulas $R^1$, $R^2$ and $R^3$ are identical or different and each denotes an alkyl radical having one to four carbon atoms or a hydrogen atom and $R^3$ may also denote a chlorine or bromine atom. The following are examples of starting materials: styrene, o-chlorostyrene, p-bromostyrene, p-methylstyrene, α-methylstyrene, β-propylstyrene, α,β-dimethylstyrene, and α-isobutylstyrene. The starting materials may be used in the gaseous or liquid condition.

Any catalyst which is suitable for the polymerization of styrene, for example an acid and/or a silicic acid compound, is suitable as the catalyst. As a rule phosphoric acid, sulfuric acid and/or halo-alkanoic acids are used as acids, in the case of a gaseous starting material (II) advantageously in a ratio of 50 to 1000, particularly 100 to 500, moles of acid (calculated as 100 percent) per mole of starting material (II). In the case of a liquid starting material (II), the relevant ratios are from 4 to 0.25, particularly 2 to 0.5, part by volume of acid (calculated as 100 percent) for each part by volume of starting material. (II). The acid may be used in concentrated form or mixed with water. Examples are: metaphosphoric acid, pyrophosphoric acid or particularly orthophosphoric acid, advantageously in the form of an aqueous solution, with 50 to 90 percent, preferably 60 to 80 percent, by weight of phosphorus pentoxide; aqueous 50 to 80 percent by weight sulfuric acid; monochloro-acetic acid, dichloroacetic acid, trichloroacetic acid and chloropropionic acid. Appropriate mixtures, advantageously of phosphoric acid and sulfuric acid, with or without water, preferably in a ratio by weight of from 70 to 95 percent by weight of phosphoric acid (calculated as 100 percent), from 0 to 20 percent by weight of sulfuric acid (calculated as 100 percent) and from 0 to 20 percent by weight of water are also suitable.

Silicates, for example sodium aluminum silicate, calcium aluminum silicate, bleaching earths, fullers earth, clays, kaolin, allophanes, zeolites, montmorillonite, pumice, Florida earths, asbestos, mullite and bentonite; silicic acid, silica gel, or diatomaceous earth, may be used as compounds of silicic acid. The silicic acid compound may also contain metal oxides, for example aluminum oxide, zirconium oxide or magensiumoxide.

Suitable solid phosphoric acid catalysts are metaphosphoric acid, pyrophosphoric acid and/or preferably orthophosphoric acid, advantageously applied as such or in the form of an aqueous solution to a carrier material. The phosphoric acid may also be in the form of a polyphosphoric acid, for example having from 72 to 88 percent by weight of $P_2O_5$. The carrier used is advantageously one of the said silicic acid compounds, preferably precipitated silicic acid, silica gel, or diatomaceous earth, but bauxite, magnesite, aluminum oxide, active carbon or quartz may also be used as carrier material. The phosphoric acid catalysts generally contain the phosphoric acid (independently of the actual constitution as orthophosphoric acid) in an amount of from 10 to 80 percent, preferably from 30 to 80 percent, by weight based on the carrier material. The production of these catalysts is carried out by conventional methods, for example by application of the acid to the carrier, drying and calcining, for example at from 200° to 900°C in a reducing, oxidizing or inert atmosphere.

The particle sizes of the solid catalysts are preferably from 1 to 10 millimeters. They may have any shape, for example spheroidal or granular. The solid catalyst is generally used in an amount of from 10 to 1,000 percent, preferably from 80 to 200 percent, by weight based on the amount of starting material (II) supplied to the reaction per hour. Reference is made to Houben-Weyl, "Methoden der Organischen Chemie," volume 4/2, pages 142 et seq., and Ullmanns "Encyklopaedie der technischen Chemie," volume 9, pages 271 et seq. for further information concerning the production of the catalysts.

The invention is based on the observation that polymerization inhibitors surprisingly promote dimerization and at the same time cyclization of styrenes to the corresponding indans. Any substance which prevents or strongly retards polymerization of monomers and thus acts as a stabilizer in relation to the monomers may be used as the polymerization inhibitor. The substance may be gaseous, solid or liquid and is preferably one which inhibits the polymerization of vinyl compounds. It is advantageous to use the following sub-stances as inhibitors: thioureas, for example thiourea, methyl-thiourea, phenylthiourea, N,N-diphenylthiourea, N,N'-diphenylthio-urea, thiosemicarbazide, p-methoxyphenylthiourea, N-p-tolyl-N-m-ethoxyphenylthiourea, N-methyl-N-(p-toluyl)-thiourea, S-benzyl-N-phenylisothiouronium picrate, S-methyldithiobiuret hydrochloride, phenylmethylthiourea, 2,4-dimethoxyphenylthiourea, 4-methoxyphenylthiourea, di-n-butylthiourea, 1-benzoylthiosemicarbazide, dithiobiuret; phenols, thiophenols and their ethers, for example hydroquinone monomethyl ether, 4-tert-butylpyrocatechol, diphenylsulfide, N-benzyl-p-aminophenol, p-aminophenol, hydroquinone, β-naphthol, o-aminophenol; sulfur-containing heterocyclic compounds having sulfur as a substituent or in a side chain on the heterocyclic ring, for example 2-mercaptobenzimidazole, 2-mercapto-4-anilinoquinazoline, 2-thiocyanatomethylbenzimidazole, 2,4-dimercaptoquinazoline or having a sulfur atom in the heterocyclic ring, for example phenothiazine, thiophene, 2-amino-4-(methylmercapto)-thiadiazole-(3,5), thionaphthene, 2-mercaptobenzothiazole, 2-aminobenzothiazole, 3-aminobenzoisothiazole, 2-methylbenzothiazole, diphenylene sulfide, 2,5-dimercapto-1,3,4-thiadiazole, and tetramethylenetrithione; substituted aromatic amines, for example p-phenylenediamine, N,N-dimethyl-α-naphthylamine, m-oxydiphenylamine, N,N-diphenyl-p-phenylene-diamine, p-oxydiphenylamine, N-phenyl-α-naphthylamine, N-phenyl-β-naphthylamine; nitroso compounds, for example o-nitrosophenol, p-nitrosophenol, m-nitrosophenol, N-nitrosophenylhydroxylamine ammonium salt (cupferron), nitrogen monoxide, dinitrogen tetroxide; organic phosphorus compounds, for example triphenyl phosphine, triphenyl phosphite; thiocarboxamides, for example thioacetamide, anthranilothiamide, 2-amino-5-nitrothiobenzamide, 2-amino-3-bromo-5-nitrothiobenzamide, 2-amino-3,5-dibromothiobenzamide, thiobenzamide; disulfides, for example dibenzyl disulfide; nitro compounds, for example o-nitroaniline, m-dinitrobenzene, and picric acid; quinones, for example p-benzoquinone, 1-nitroanthraquinone-2-carboxylic acid, and 1-nitro-2-methylanthraquinone; polyamides, for example hexamethylenetetramine, aniline black; hydrazine derivatives, for example hydrazobenzene; and appropriate mixtures. The amount of polymerization inhibitor used is generally from $10^{-5}$ to $10^{-2}$, preferably from $10^{-4}$ to $10^{-3}$, mole of polymerization inhibitor per mole of starting material (II).

The reaction is carried out as a rule at a temperature of from 30° to 200°C at subatmospheric or superatmospheric pressure, for example at from 0.3 to 30 atmospheres, particularly from 0.5 to 1.5 atmospheres, or preferably at atmospheric pressure, continuously or batchwise. In the case of liquid catalysts temperature of from 40° to 80°C are preferred and in the case of solid catalysts temperatures of from 100° to 150°C. Organic solvents which are inert under the reaction conditions, for example aliphatic hydrocarbons such as n-pentane or n-heptane, cycloaliphatic hydrocarbons such as cyclohexane, or mixtures of the same may also be used if desired.

The reaction may be carried out as follows:
Any apparatus in which styrene is brought into intimate contact with the catalyst may be used as the reactor, in the case of liquid catalysts such as the said acids, for example, a packed column, a bubble column, a cascade reactor, a sieve plate column, an Oldershaw column, glass plate column, a bubble tray column, or a valve plate column. The gaseous or liquid styrene is dimerized at the reaction temperature in the reactor while flowing cocurrent or countercurrent to the acid. Depending on the type of reactor, the acid may be placed therein and the styrene passed through while mixing well. When using columns it is advantageous to pass the acid continuously through the reactor and the liquid throughput is advantageously from 10 to 100m³ per m² of the cross-section of the column per hour. After the acid has left the column, organic reaction product may be separated therefrom before it is returned to the reactor. The vapor speed of the gaseous styrene is advantageously from 0.1 to 2.0 m/sec with reference to the column cross-section. The residence time in the reactor is as a rule from 0.1 to 5 minutes. The reaction mixture is then separated in an attached separation unit from the acid and the end product is isolated by a conventional method, for example by fractional distillation. Unreacted starting material and the acid are returned to the reaction. Generally the starting material is supplied to the reactor in gaseous or liquid condition. If desired it may be supplied in the liquid condition, vaporized in the reactor and only then brought into contact with the acid to begin the reaction.

A mixture of starting material (II) and acid may also be reacted continuously or batchwise for 0.5 to 2 hours in a stirred vessel or a cascade of stirred vessels at the reaction temperature. It is advantageous in such cases to use a reaction temperature of from 30°C to the boiling point of the styrene concerned at the reaction pressure, for example 0.3 to 3.0 atmospheres.

The following is also an advantageous embodiment of the reaction: Styrene (II) is dimerized at the reaction temperature in the presence of acid and the appropriate indan (I) in the abovementioned concentrations in a stirred apparatus or a cascade of stirred vessels with intense mixing, advantageously with a stirrer output of from 5 to 10 kw/m³. Such amounts of starting material are supplied and such amounts of reaction mixture withdrawn that the abovementioned concentrations of starting material and end product are maintained in the organic phase of the mixture during the entire reaction period. The residence time of the reaction mixture in the reaction chamber is generally 10 to 30 minutes. The mixture of the reaction components may be prepared at the beginning at the reaction temperature or at a lower temperature and then brought to the reaction temperature. In a cascade of stirred vessels, the individual stirred vessels may be kept at different reaction temperatures.

The portion of the reaction mixture which is continuously withdrawn passes to phase separation. The aqueous phase, which contains the acid, may be reused immediately for the reaction. The acid may however be processed by conventional methods, for example by filtration, centrifuging, distillation or extraction. In the case of a cascade of stirred vessels, each vessel may have its own acid circulation or all the vessels may have a common loop. In the former case the concentration of the acid may for example be varied from vessel to vessel. The end product is separated from the organic phase by a conventional method, for example by distillation.

In the case of a solid catalyst, the starting material (II) may be passed in liquid or gaseous phase at the reaction temperature over a bed of catalyst in a tubular reactor. Batchwise, mixtures of starting material (II) and solid catalyst may be reacted in a similar manner to that in the case of liquid acid catalysts. The catalyst may be suspended in the liquid starting material (II) or may be fluidized (fluidized bed).

The polymerization inhibitor may be supplied to the reaction in any way, for example mixed with the material (II) or with the solid catalyst or in solution or suspension in a liquid catalyst or as a separate addition. Depending on the constitution of the end product, the inhibitor may be separated from the organic phase and reused or (in the case of acid-soluble inhibitors) returned to the reaction with the acid.

Compounds which may be prepared by the process according to the invention are valuable starting materials for the production of dyes and pesticides. As regards their use, reference is made to the above-mentioned publications.

The following examples illustrate the invention. The parts specified in the following examples are parts by weight. Parts by weight bear the same relation to parts by volume as the kilogram to the liter.

EXAMPLES 1 to 66

Batchwise liquid-liquid dimerization:

Method A: 100 parts of phosphoric acid (98 percent by weight) is heated to 50° to 60°C in a stirred vessel and at this temperature 100 parts by volume of styrene which contains the number of parts of polymerization inhibitor given in the following Table is added in portions in the course of 40 minutes. Then the end product (I) (1-methyl-3-phenylindan) is separated by extraction of the reaction mixture with 100 parts of methylene chloride followed by fractional distillation of the extract. The composition of the distillate is determined by gas chromatography. The total yield of dimer (D), of linear styrene dimer (S) and the yield of end product (I) are given in Table 1 together with the number of the Example (E), the name of the inhibitor used and the number of parts (P) thereof used, and the method (M). The yields of (D) and (I) are given in percent of theory based on starting material (II) and the yield of (S) is given in percent by weight based on (D).

Method B: The inhibitor is dissolved in the appropriate amount of acid and placed in the reactor. Otherwise the method is the same as method (A).

TABLE 1

| (E) Inhibitor | (P) | (M) | (D) | (S) | (I) |
| --- | --- | --- | --- | --- | --- |
| 1 nil | – | – | 66 | 10 | 60 |
| 2 thiourea | 0.1 | B | 79.5 | 10.0 | 71.6 |
| 3 N-phenylthiourea | 0.1 | B | 79.4 | 12.4 | 69.6 |
| 4 N,N-di-n-butylthiourea | 0.1 | B | 75.0 | 10.1 | 64.9 |
| 6 2,4-dimethoxyphenylthiourea | <0.1 | A | 76.6 | 9.8 | 71.1 |
| 7 N-phenyl-N-methylthiourea | 0.5 | A | 75.0 | 11.7 | 66.2 |
| 8 N-methyl-N-(p-tolyl)-thiourea | <0.1 | A | 79.5 | 11.1 | 70.4 |
| 9 thioacetamide | 0.1 | B | 72.7 | 10.4 | 65.2 |
| 10 N,N'-diphenylthiourea | 0.1 | A | 79.5 | 9.2 | 72.2 |
| 11 S-benzyl-N-phenylisothiouronium picrate | 0.1 | B | 77.2 | 10.0 | 69.5 |
| 12 2-amino-3-bromo-5-nitrothiobenzamide | 0.5 | A | 77.3 | 9.9 | 69.7 |
| 13 3,5-dibromoanthranilothiamide | 0.1 | A | 79.6 | 10.5 | 71.2 |
| 14 S-methyldithiobiuret hydrochloride | 0.1 | B | 77.2 | 10.3 | 69.3 |
| 15 2-mercapto-4-anilinoquinazoline | 0.1 | A | 72.8 | 9.5 | 65.9 |
| 16 3-aminobenzoisothiazole | 0.1 | B | 73.8 | 12.4 | 64.7 |
| 17 2-methylbenzothiazole | 0.5 | A | 71.6 | 14.9 | 61.0 |
| 18 dimercaptothiodiazole | 0.1 | B | 81.7 | 12.3 | 71.7 |
| 19 tetramethylenetrithione | 0.1 | A | 77.2 | 11.1 | 68.7 |

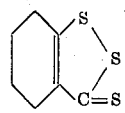

| 20 1-benzoylthiosemicarbazide | <0.1 | A | 78.4 | 10 | 70.6 |
| --- | --- | --- | --- | --- | --- |

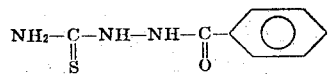

| | | | | | |
|---|---|---|---|---|---|
| 21 p-nitrosophenol | <0.1 | A | 73.4 | 9.15 | 66.7 |
| 22 hydroquinone methyl ether | 0.1 | A | 74.0 | 11.5 | 65.5 |
| 23 o-aminopheno | 0.1 | A | 73.6 | 9.4 | 66.7 |
| 24 N-benzyl-p-aminophenol | <0.1 | A | 75.2 | 9.3 | 68.2 |
| 25 2-mercaptobenzimidazole | 0.1 | A | 76.2 | 10 | 68.6 |

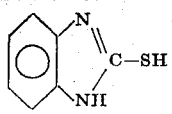

| | | | | | |
|---|---|---|---|---|---|
| 26 2-thocyanatomethylbenzimidazole | 0.1 | A | 76.0 | 10 | 68.5 |

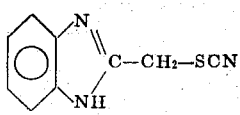

| | | | | | |
|---|---|---|---|---|---|
| 27 pehnothiazine | 0.5 | A | 76.2 | 11.9 | 67.1 |
| 28 phenothiazine | 0.5 | B | 84.2 | 10.9 | 76.1 |
| 29 thionaphthene | 0.5–2.0 | A | 84.3 | 12.2 | 74.0 |
| 30 2-mercaptobenzothiazole | 0.1 | A | 73.4 | 9.6 | 66.4 |
| 31 2-aminobenzothiazole | 0.5 | A | 74.9 | 13.4 | 64.9 |
| 32 N-phenyl-α-naphthylamine | 0.1–0.5 | A | 78.4 | 11.2 | 69.6 |
| 33 N-phenyl-β-naphthylamine | 0.1–0.5 | A | 78.5 | 12.7 | 68.6 |
| 34 cupferron | 0.1 | B | 77.2 | 9.7 | 69.7 |
| 35 p-nitrosophenol | <0.1 | A | 73.4 | 9.15 | 66.7 |
| 36 triphenyl phosphite | 0.1 | A | 76.2 | 9.2 | 69.2 |
| 37 triphenyl phosphite | 0.1 | A | 72.7 | 12.4 | 63.7 |
| 38 dithiobiuret | 0.1 | B | 80.7 | 10.0 | 72.6 |
| 39 5-nitroanthranilothiamide | 0.1 | B | 73.8 | 9.5 | 66.6 |
| 40 p-aminophenol | 0.1 | B | 73.2 | 7.9 | 67.4 |
| 41 hydroquinone | 0.1 | B | 71.2 | 8.6 | 65.1 |
| 42 diphenyl sulfide | 0.1 | B | 72.1 | 9.5 | 65.3 |
| 43 dibenzyl disulfide | 0.1 | B | 74.6 | 7.8 | 68.8 |
| 44 4-tert-butylpyrocatechol | 1.0 | A B | 67.6 | 9.7 | 61.2 |
| 45 thiophene | 0.1 | A B | 70.5 | 10.8 | 64.0 |
| 46 β-naphthol | 0.1 | B | 70.8 | 10.1 | 63.8 |
| 47 o-nitroaniline | 0.5 | A B | 72.8 | 8.1 | 66.9 |
| 48 p-phenylenediamine | 0.1 | B | 78.1 | 8.1 | 71.8 |
| 49 m-dinitrobenzene | 0.1 | B | 67.0 | 7.3 | 62.1 |
| 50 benzoquinone | 0.1 | B | 68.9 | 6.2 | 64.66 |
| 51 hexamethylenetetramine | 0.1 | B | 68.2 | 7.9 | 62.8 |
| 52 thiosemicarbazide | 0.1 | B | 79.9 | 11.0 | 72.6 |
| 53 2-amino(methylmercapto)-thiadiazole-(3,5) | 0.5 | B | 74.1 | 9.2 | 67.3 |
| 54 hydrazobenzene | 0.1 | B | 82.2 | 10.8 | 73.3 |
| 55 p-methoxyphenylthiourea | 0.1 | B | 78.4 | 9.9 | 70.7 |
| 56 N,N-dimethyl-α-naphthylamine | 0.1 | B | 73.1 | 11.4 | 64.8 |
| 57 N-p-tolyl-N-m-ethoxyphenylthiourea | 0.1 | B | 82.4 | 10.5 | 73.8 |
| 58 2,4-dimercaptoquinazoline | 0.1 | B | 74.5 | 11.5 | 65.9 |
| 59 anthranilothiamide | 0.1 | B | 74.2 | 8.9 | 67.6 |
| 60 n-oxydiphenylamine | 0.1 | B | 78.2 | 8.3 | 71.7 |
| 61 p-oxydiphenylamine | 0.1 | B | 75.6 | 6.4 | 70.8 |
| 62 N,N-diphenyl-p-phenylene phenylenediamine | 0.1 | B | 82.1 | 9.5 | 74.3 |
| 63 picric acid | 0.1 | B | 70.2 | 6.2 | 65.8 |
| 64 1-nitroanthraquinone-2-carboxylic acid | 0.1 | B | 70.5 | 10.1 | 63.4 |
| 65 1-nitro-2-methylanthraquinone | 0.1 | B | 73.4 | 8.6 | 67.1 |
| 66 aniline black | 0.5 | B | 78.2 | 11.8 | 69.0 |

EXAMPLES 67 to 69

Continuous liquid-liquid dimerization:

50 parts of styrene per hour is passed into a continuously stirred apparatus containing 100 parts of phosphoric acid (98 percent by weight) and 58 parts of 1-methyl-3-phenylindan. The reaction mixture is mixed well and the reaction temperature is 70° to 75°C. 50 parts per hour of reaction mixture is withdrawn. In method (A) the appropriate amount of inhibitor is dissolved in the styrene and passed continuously into the reaction mixture, in method (B) the additive is dissolved in the acid. The withdrawn portion of the reaction mixture is supplied through a lateral outlet to a separating vessel. Phosphoric acid separating therein as the lower phase is returned to the reactor. The organic phase is fractionally distilled. In the same way as in Table 1, the results are set out in Table 2.

TABLE 2

| (E) Inhibitor | | | (P) | (M) | (D) | (S) | (I) |
|---|---|---|---|---|---|---|---|
| 67 mil | | | – | – | 63.8 | 2.5 | 62.3 |
| 68 phenothiazine | 0.1 | A | | | 79.8 | 5.1 | 74.8 |
| 69 phenylthiourea | 0.05 | B | | | 84.0 | 9.8 | 75.7 |

EXAMPLE 70

Reaction in contact with a solid catalyst:

100 parts of liquid styrene in which 1 part of phenylthiourea is dissolved is passed per hour over 100 parts of a diatomaceous earth-phosphoric acid catalyst (38 percent by weight of $H_3PO_4$). The catalyst is arranged in a tubular reactor as a fixed bed. The temperature in the reactor is 130°C. 90 parts of starting material (II) is reacted per hour. The issuing reaction mixture is fractionally distilled. Of each 100 parts of reacted styrene, 79.8 parts of dimers consisting of 28 parts of linear dimers and 51.8 parts of 1-methyl-3-phenylindan are obtained. In a comparative reaction without adding phenylthiourea, only 30.5 parts of dimers and 18 parts of end product (I) are obtained.

We claim:

1. A process for the production of a 1-methyl-3-phenylindan having the general formula:

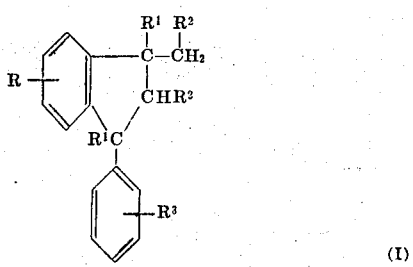

in which $R^1$, $R^2$ and $R^3$ may be identical or different and each denotes an alkyl radical or a hydrogen atom, and $R^3$ may also denote a halogen atom, by dimerization of a styrene in the presence of a catalyst wherein the reaction is carried out with a styrene having the general formula:

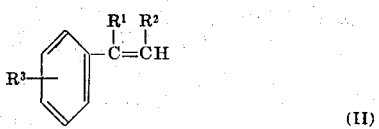

in which $R^1$, $R^2$ and $R^3$ have the meanings given above in the presence of a polymerization inhibitor.

2. A process as claimed in claim 1 wherein the reaction is carried out in the presence of phosphoric acid as the catalyst.

3. A process as claimed in claim 1 wherein the reaction is carried out in the presence of sulfuric acid as the catalyst.

4. A process as claimed in claim 1 wherein the reaction is carried out in the presence of a haloalkanoic acid as catalyst.

5. A process as claimed in claim 1 wherein the reaction is carried out in the presence of a silicic acid compound as the catalyst.

6. A process as claimed in claim 1 wherein the reaction is carried out in the presence of from $10^{-5}$ to $10^{-2}$ mole of polymerization inhibitor per mole of starting material (II).

7. A process as claimed in claim 1 carried out at a temperature of from 40° to 80°C.

8. A process as claimed in claim 1 carried out at a temperature of from 40° to 80°C.

9. A process as claimed in claim 1 carried out at a temperature of from 100° to 150°C.

10. A process as claimed in claim 1 carried out in the presence of a solvent which is inert under the reaction conditions.

* * * * *